(12) United States Patent
Chang

(10) Patent No.: US 7,695,165 B2
(45) Date of Patent: Apr. 13, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 221 days.

(21) Appl. No.: 11/923,672

(22) Filed: Oct. 25, 2007

(65) Prior Publication Data

US 2009/0002999 A1  Jan. 1, 2009

(30) Foreign Application Priority Data

Jun. 28, 2007  (CN) .......................... 2007 1 0200916

(51) Int. Cl.
  *F21V 7/00* (2006.01)
(52) U.S. Cl. .................. 362/307; 362/620; 362/626
(58) Field of Classification Search .................. 362/307, 362/612, 626, 632–634, 620
  See application file for complete search history.

(56) References Cited

U.S. PATENT DOCUMENTS

| | | | |
|---|---|---|---|
| 6,752,505 B2* | 6/2004 | Parker et al. | 362/627 |
| 6,925,243 B2* | 8/2005 | Lin | 385/146 |
| 6,997,595 B2* | 2/2006 | Mi et al. | 362/626 |
| 2007/0147073 A1* | 6/2007 | Sakai et al. | 362/607 |
| 2007/0147089 A1* | 6/2007 | Lin et al. | 362/616 |

* cited by examiner

*Primary Examiner*—Sandra L O'Shea
*Assistant Examiner*—Evan Dzierzynski
(74) *Attorney, Agent, or Firm*—Frank R. Niranjan

(57) ABSTRACT

An exemplary optical plate includes one or more transparent plate unit. The transparent plate unit includes a light output surface, a bottom surface, a plurality of elongated V-shaped protrusions, a plurality of conical frustum protrusions, and a lamp-receiving portion. The light output surface is opposite to the bottom surface. The elongated V-shaped protrusions are formed on the bottom surface. The conical frustum protrusions are formed on the light output surface. The lamp-receiving portion is defined in the bottom surface. A backlight module using the present optical plate is also provided.

15 Claims, 10 Drawing Sheets

OPTICAL PLATE AND BACKLIGHT MODULE USING THE SAME

CROSS-REFERENCE TO RELATED APPLICATIONS

This application is related to twenty three co-pending U.S. patent applications, which are: application Ser. No. 11/835,425, Ser. No. 11/835,426, Ser. No. 11/835,427, Ser. No. 11/835,428, Ser. No. 11/835,429, Ser. No. 11/835,430, and Ser. No. 11/835,431, filed on Aug. 8, 2007, and all entitled "OPTICAL PLATE AND BACKLIGHT MODULE USING THE SAME", application Ser. No. 11/836,799 filed on Aug. 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", application Ser. No. 11/843,669 and Ser. No. 11/843,670, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", application Ser. No. 11/845,792, Ser. No. 11/845,793, and Ser. No. 11/845,794, filed on Aug. 28, 2007, all entitled "OPTICAL PLATE AND BACKLIGHT MODULE USING THE SAME", application Ser. No. 11/850,040 and Ser. No. 11/850,041, filed on Sep. 5, 2007, both entitled "OPTICAL PLATE AND BACKLIGHT MODULE USING THE SAME", application Ser. No. 11/861,310 and Ser. No. 11/861,311, filed on Sep. 26, 2007, both entitled "OPTICAL PLATE AND BACKLIGHT MODULE USING THE SAME", application Ser. No. 11/862,203, filed on Sep. 27, and entitled "OPTICAL PLATE AND BACKLIGHT MODULE USING THE SAME", and application Ser. No. 11/874,918, Ser. No. 11/874,919, and Ser. No. 11/874,920, filed on Oct. 19, 2007, all entitled "OPTICAL PLATE AND BACKLIGHT MODULE USING THE SAME". In all these co-pending applications, the inventor is Shao-Han Chang. All of the co-pending applications have the same assignee as the present application. The disclosures of the above identified applications are incorporated herein by reference.

BACKGROUND OF THE INVENTION

1. Field of the Invention

The present invention relates to an optical plate for use in a backlight module, and the backlight module typically being employed in a liquid crystal display (LCD).

2. Discussion of the Related Art

In a liquid crystal display device, liquid crystal is a substance that does not itself illuminate light. Instead, the liquid crystal relies on light received from a light source to display data images. In the case of a typical liquid crystal display device, a backlight module powered by electricity supplies the needed light.

FIG. 10 represents a typical direct type backlight module 100. The backlight module 100 includes a housing 101, a light reflective plate 102, a light diffusion plate 103, a prism sheet 104, and a plurality of light emitting diodes 105 (hereinafter called LEDs). The housing 101 includes a rectangular base 1011 and four sidewalls 1013 extending around a periphery of the base 1011. The base 1011 and the four sidewalls 1013 cooperatively define a chamber 1017. Each LED 105 includes a base portion 1053 and a light-emitting portion 1051 positioned on the base portion 1053. The LEDs 105 are electrically connected to a printed circuit board (not labeled), and the printed circuit board is fixed to the base 1011 of the housing 101. The light reflective plate 102 is positioned on the LEDs 105 in the chamber 1017. The light reflective plate 102 defines a plurality of through holes (not labeled) that allows the light-emitting portions 1051 of the LEDs 105 to pass through and to emit light to be transmitted to the light diffusion plate 103. The light diffusion plate 103 and the prism sheet 104 are stacked in that order on the chamber 1017. Light emitted from the LEDs 105 is substantially reflected by the light reflective sheet 102 to enter the light diffusion plate 103, and diffused uniformly in the light diffusion plate 103, and finally surface light is outputed from the prism sheet 104.

Generally, a plurality of dark areas may occur because of the reduced intensity of light between adjacent LEDs 105. In the backlight module 100, each LED 105 further includes a reflective sheet 106 positioned on the top of the light-emitting portion 1051, configured for decreasing the brightness of a portion of the backlight module 100 above the LED 105. As a result, the brightness of the backlight module 100 is still not uniform. One method of enhancing the uniformity of brightness of the backlight module 100 is to increase the space between the light diffusion plate 103 and the LEDs 105. This increase in space tends to eliminate potential dark areas. However, increasing the space between the diffusion plate 103 and the LEDs 105 will also increase the thickness of the backlight module and further the overall intensity of the output light rays is reduced.

What is needed, therefore, is a new optical plate and a backlight module using the optical plate that can overcome the above-mentioned shortcomings.

SUMMARY

An optical plate according to a preferred embodiment includes one or more transparent plate unit. The transparent plate unit includes a first surface, a second surface, a plurality of elongated V-shaped protrusions, a plurality of conical frustum protrusions, and a lamp-receiving portion. The second surface is opposite to the first surface. The elongated V-shaped protrusions are formed on the first surface. The conical frustum protrusions are formed on the second surface. The lamp-receiving portion is defined in at least one of the first surface and the second surface.

A backlight module according to a preferred embodiment includes a housing, one or more point light source, an optical plate, and a light diffusion plate. The housing includes a base and a plurality of sidewalls extending around a periphery of the base, the base and the sidewalls cooperatively forming an opening. The point light source is positioned on the base. The point light source has a light-emitting portion and a reflective member positioned above the top of the light-emitting portion. The same optical plate as described in the previous paragraph is employed in this embodiment. The light-emitting portion of the point light source is inserted in the lamp-receiving portion of the optical plate correspondingly. The light diffusion plate is positioned on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
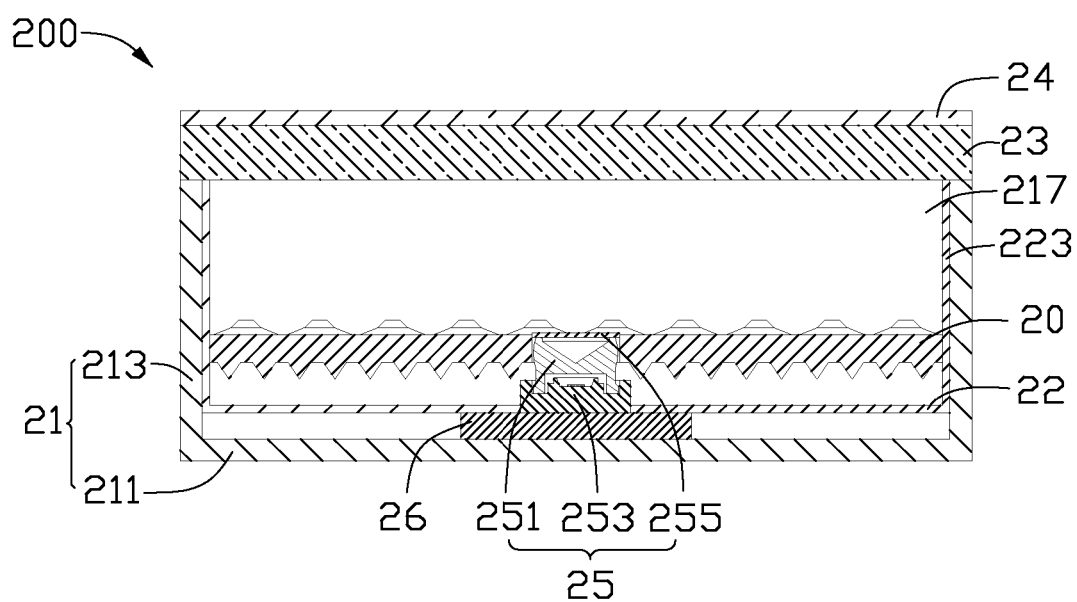
FIG. 1 is a side cross-sectional view of a backlight module using an optical plate according to a first preferred embodiment of the present invention.
Figure 2:
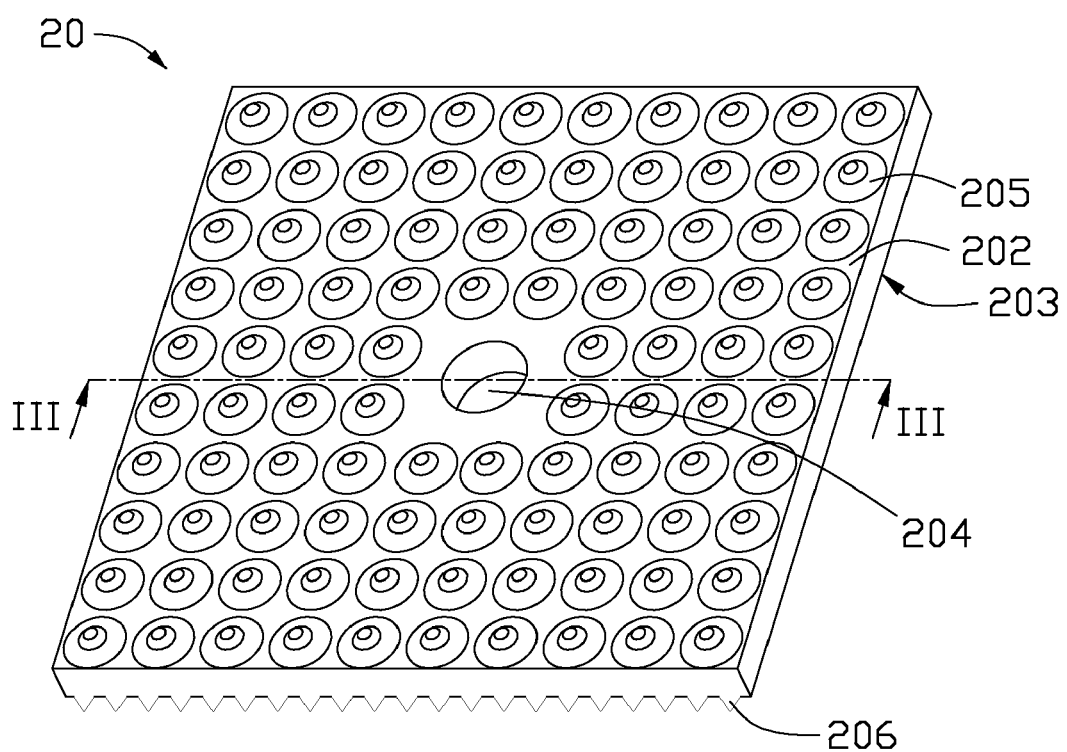
FIG. 2 is an isometric view of the optical plate of FIG. 1.
Figure 3:
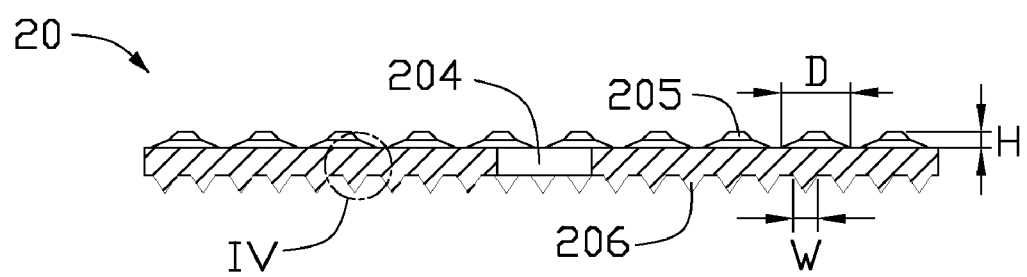
FIG. 3 is a cross-sectional view of the optical plate taken along line III-III of FIG. 2.
Figure 4:
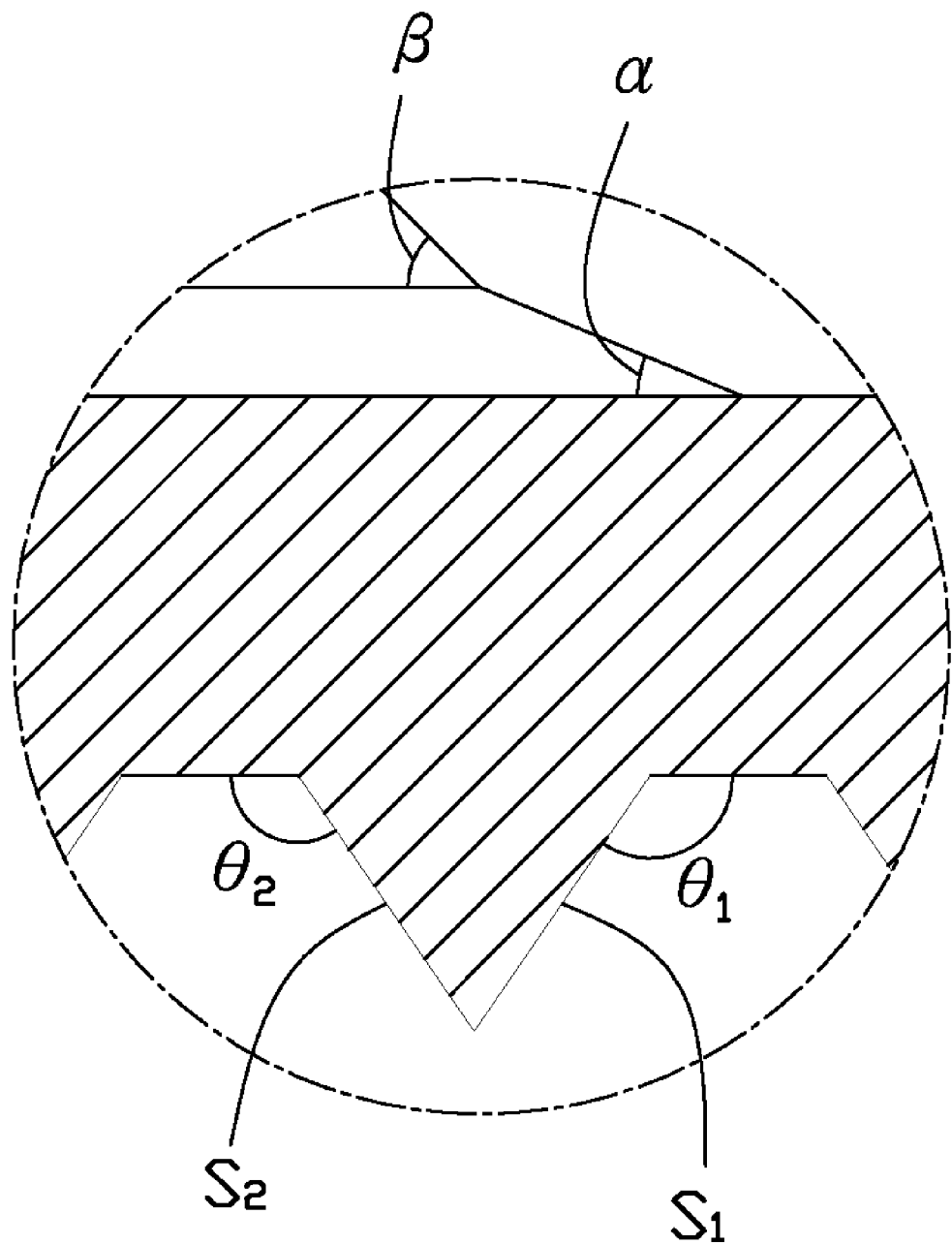
FIG. 4 is an enlarged view of a circled portion IV of FIG. 3.
Figure 5:
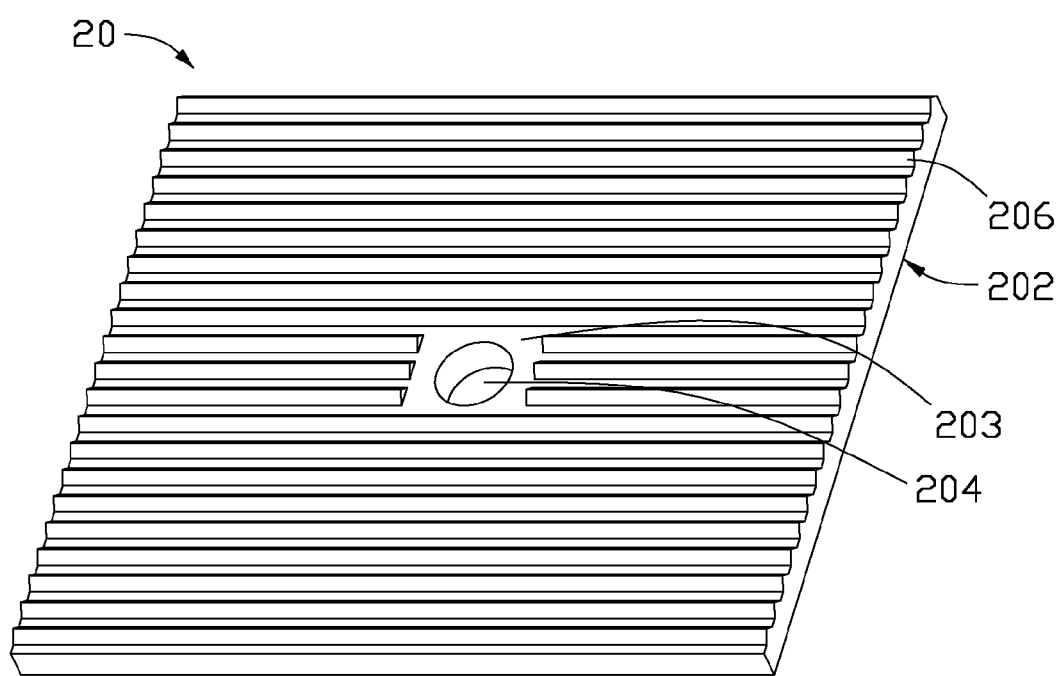
FIG. 5 an isometric, inverted view of the optical plate of FIG. 2.

Referring to FIG. 1, a backlight module 200 in accordance with a first preferred embodiment is shown. The backlight module 200 includes an optical plate 20, a housing 21, a light reflective plate 22, a light diffusion plate 23, and a LED 25. The housing 21 includes a rectangular base 211 and four sidewalls 213 extending around a periphery of the base 211, the base 211 and the sidewalls 213 cooperatively forming an opening 217. The optical plate 20, the light reflective plate 22 and the LED 25 are received in the housing 21. The light diffusion plate 23 is positioned on the housing 21 over the opening 217.

Referring to FIGS. 2 through 5, the optical plate 20 is a transparent plate that can be mounted into the housing 21. The optical plate 20 includes a light output surface 202 (shown in FIG. 2) and a bottom surface 203 (shown in FIG. 5) opposite to the light output surface 202. A plurality of conical frustum protrusions 205 are formed on the light output surface 202. A plurality of elongated V-shaped protrusions 206 are formed on the bottom surface 203. The optical plate 20 further includes a lamp-receiving portion 204 defined in the bottom surface 203 at a center of the light optical plate 20. In the illustrated embodiment, the lamp-receiving portion 204 is a through hole communicating between the light output surface 202 and the bottom surface 203. The optical plate 20 can be made of material selected from the group consisting of polycarbonate (PC), polymethyl methacrylate (PMMA), polystyrene (PS), copolymer of methylmethacrylate and styrene (MS), and any suitable combination thereof.

The conical frustum protrusions 205 are distributed in a matrix manner at the light output surface 202 except for a substantially square area around the lamp-receiving portion 204. In the illustrated embodiment, each conical frustum protrusion 205 is a stacked conical frustum protrusion. That is, each conical frustum protrusion 205 has a first conical frustum protrusion and a second conical frustum protrusion. The first conical frustum protrusion extends from the light output surface 202 and the second conical frustum protrusion extends from a top of the first conical frustum protrusion. In each conical frustum protrusion 205, an inclined angle $\alpha$ of a conical surface of the first conical protrusion relative to its base surface is equal to or smaller than an inclined angle $\beta$ of a conical surface of the second conical protrusion relative to its base surface. In other words, a slope of the conical surface of the first conical protrusion is equal to or more slanted than a slope of the conical surface of the second conical frustum protrusion. Each of the inclined angles $\alpha$, $\beta$ is larger than zero, and equal to or smaller than 60 degrees. In addition, a diameter D of a bottom end of each conical frustum protrusion 205 is configured to be in a range from about 0.02 millimeters to about 4 millimeters. A height H of each conical frustum protrusion 205 is configured to be in a range from about 0.01 millimeters to about 3 millimeters. The elongated V-shaped protrusions 206 are aligned with each other. Each elongated V-shaped protrusion 206 has two side surfaces $S_1$, $S_2$ meeting with each other. In a same elongated V-shaped protrusion 206, a distance from the side surface $S_1$ to the lamp receiving portion 204 is smaller than a distance from the side surface $S_2$ to the lamp receiving portion 204. An angle $\theta_1$ of the side surface $S_1$ relative to its base surface is equal to or smaller than an angle $\theta_2$ of the side surface $S_2$ relative to its base surface. The angle $\theta_1$ is larger than 90 degrees, and equal to or smaller than 120 degrees. The angle $\theta_2$ is larger than 105 degrees, and equal to or smaller than 150 degrees. In other words, a slope of the side surface $S_1$ is equal to or more slanted than that of side surfaces $S_2$. A width W of a bottom end of each elongated V-shaped protrusion 206 is configured to be in a range from about 0.05 millimeters to about 0.5 millimeters.

Referring to FIG. 1 again, in the illustrated embodiment, the LED 25 includes a base portion 253, a light-emitting portion 251 positioned on the base portion 253, and a reflective member 255 positioned on the light-emitting portion 251. The LED 25 is electrically connected to a printed circuit board 26 that is fixed to the base 211 of the housing 21. In the illustrated embodiment, the reflective member 255 is a light reflective sheet that is positioned on the top of the light-emitting portion 251. In an alternative embodiment, the reflective member 255 can be a light reflective film formed on the top of the light-emitting portion 251 or on the optical plate 20 above the lamp-receiving portion 204.

The light-emitting portion 251 of the LED 25 is inserted into the lamp-receiving portion 204 of the optical plate 20, and the light output surface 202 of the optical plate 20 faces the light diffusion plate 23. The light reflective plate 22 defines a through hole (not labeled) therein. The light reflective plate 22 is positioned under the bottom surface 203 of the optical plate 20, and the LED 25 passes through the light reflective plate 22 via the through hole.

In use, light emitted from the light-emitting portion 251 of the LED 25 enters the optical plate 20 via an inner surface of the lamp-receiving portion 204. A significant amount of light travels through the optical plate 20. Since the surfaces of the conical frustum protrusions 205 are curved, incident light that may have been internally reflected on a flat surface, are refracted by the curved surfaces of the conical frustum protrusions 205. As a result, a great amount of light is able to exit from the light output surface 212, faster.

In addition, the conical frustum protrusions 205 can condense and collimate light exiting from the light output surface 202, thereby improving a light illumination brightness. Furthermore, because the LED 25 is positioned in the lamp-receiving portion 204, light is uniformly outputted from the light output surface 202 of the optical plate 20. Light from the optical plate 20 can further be substantially mixed in a chamber between the optical plate 20 and the light diffusion plate 23, and before passing through the light diffusion plate 23 as uniform surface light. A distance from the LED 25 to the light diffusion plate 23 may be configured to be very small, with little or no potential risk of having dark areas on the portion of the backlight module 200 directly above the LED 25. Accordingly, the backlight module 200 can have a compact configuration while still providing good, uniform optical performance.

It should be pointed out that, the light reflective plate 22 can be omitted. In an alternative embodiment, a high reflectivity film can be deposited on inner surfaces of the base 211 and the sidewalls 213 of the housing 21. In other alternative embodiment, the housing 21 is made of metal materials and has a high reflectivity inner surface.

It is to be understood that, in order to improve brightness of the backlight module 200 within a specific viewing range, the backlight module 200 can further include a prism sheet 24 positioned on the light diffusion plate 23. In addition, in order to improve light energy utilization rate of the backlight module 200, the light reflective plate 22 can further include four reflective sidewalls 223 extending around a periphery thereof and contacting with the sidewalls 213 of the housing 21 respectively.

It is noted that the scope of the present optical plate is not limited to the above-described embodiments. In particular, even though specific shape of conical frustum protrusions 205 has been described and illustrated, the conical frustum protrusions (stacked conical frustum protrusions) 205 can have various other suitable shapes. For example, each conical frustum protrusion can be only one conical frustum protrusion.

Figure 6:
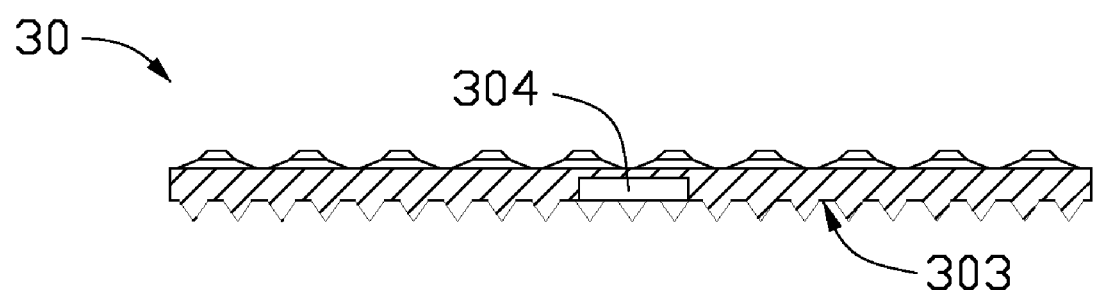
FIG. 6 is a side cross-sectional view of an optical plate according to a second preferred embodiment of the present invention.

Referring to FIG. 6, an optical plate 30 in accordance with a second preferred embodiment is shown. The optical plate 30 is similar in principle to the optical plate 20 of the first embodiment, however a lamp-receiving portion 304 defined in a bottom surface 303 of the optical plate 30 is a blind hole. It should be pointed out that, a LED with a reflective member formed on the top of the light-emitting portion can be mounted into the lamp-receiving portion 304 of the optical plate 30 to form a backlight module. Alternatively, a reflective member of the LED can be also positioned on a part of the optical plate 30 above the lamp-receiving portion 304.

Figure 7:
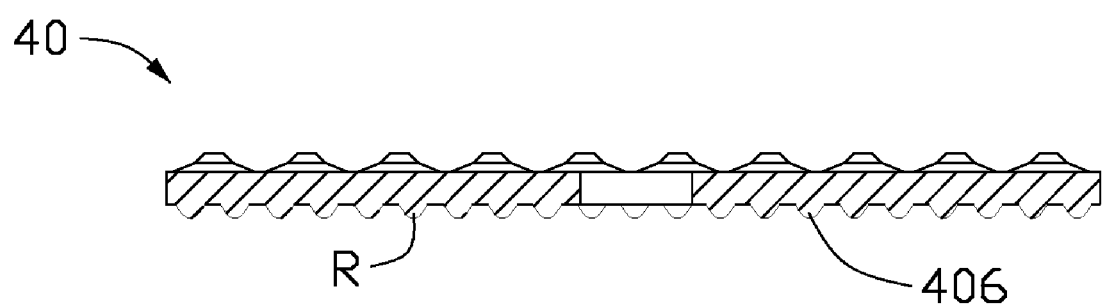
FIG. 7 is a side cross-sectional view of an optical plate according to a third preferred embodiment of the present invention.

Referring to FIG. 7, an optical plate 40 in accordance with a third preferred embodiment is shown. The optical plate 40 is similar in principle to the optical plate 20, except that a top edge of each elongated V-shaped protrusion 406 is rounded. A curvature of this rounded surface is defined by a sphere of radius R. It can be understood that, a bottom edge defined by the boundary formed by two adjacent microstructures 406 can also be rounded.

Figure 8:
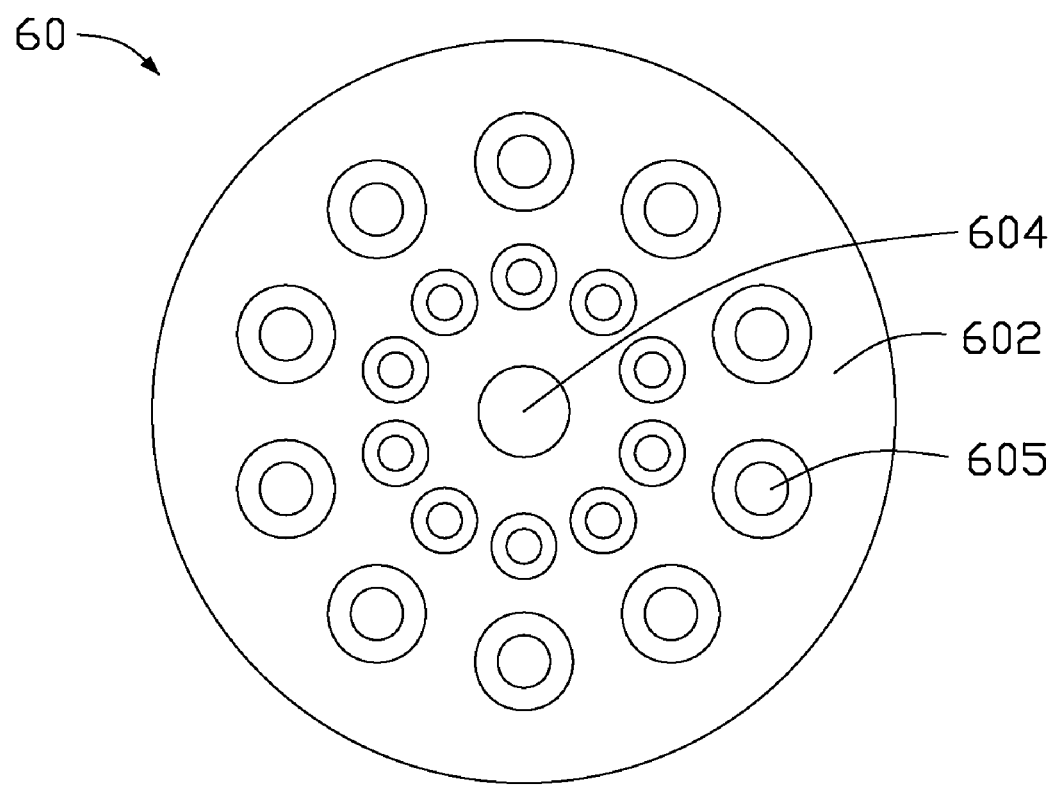
FIG. 8 is an isometric view of an optical plate according to a fourth preferred embodiment of the present invention.

Referring to FIG. 8, an optical plate 60 in accordance with a fourth preferred embodiment is shown. The optical plate 60 is similar in principle to the optical plate 20, except that conical frustum protrusions 605 formed on a light output surface 602 are distributed symmetrically relative to a lamp-receiving portion 604 of the optical plate 60, a diameter of each of the conical frustum protrusions 605 increases with increasing distance from the lamp-receiving portion 604. This configuration of the optical plate 60 may have a relatively good uniformity of light output.

Figure 9:
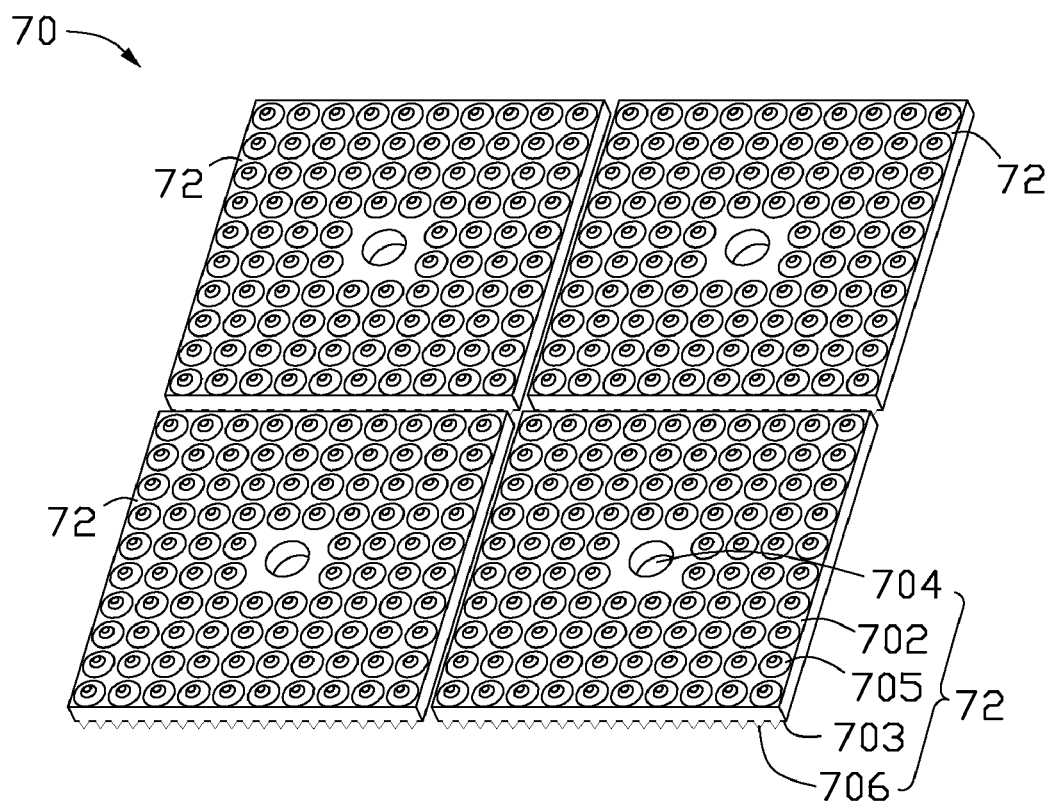
FIG. 9 is an exploded, isometric view of an optical plate according to a fifth preferred embodiment of the present invention.
Figure 10:
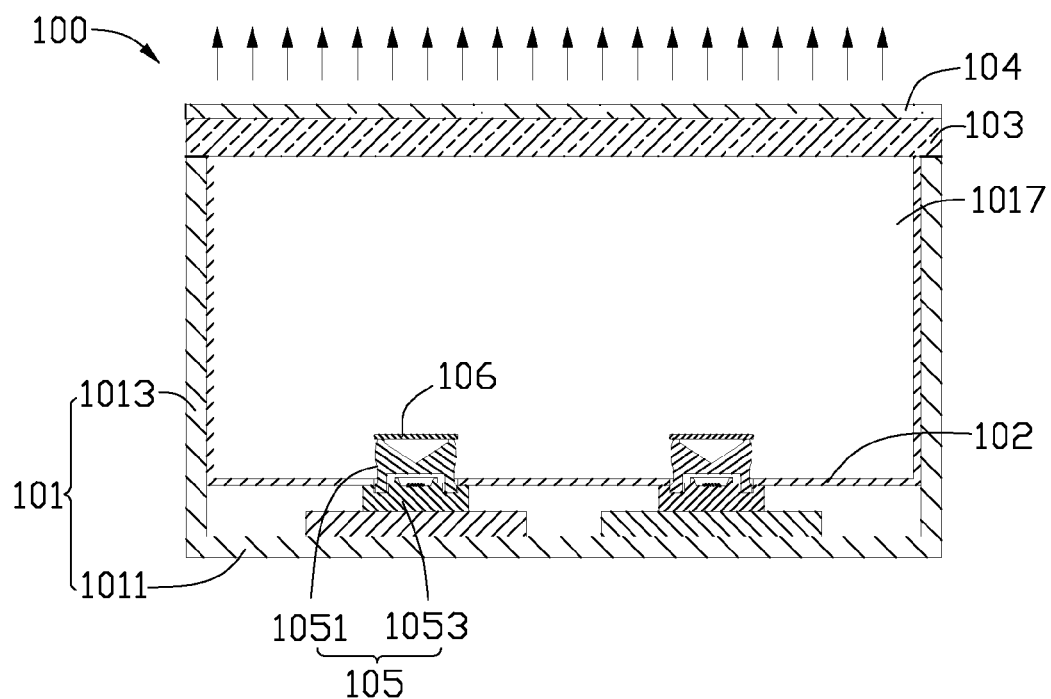
FIG. 10 is a side cross-sectional view of a conventional backlight module.

Referring to FIG. 9, an optical plate 70 in accordance with a fifth preferred embodiment is shown. The optical plate 70 includes four transparent plate units 72. Each transparent plate unit 72 is the same as the optical plate 20 of the first embodiment. Each transparent plate unit 72 includes a light output surface 702, a bottom surface 703 opposite to the light output surface 702, a plurality of conical frustum protrusions 705 formed on the light output surface 702, a plurality of elongated V-shaped protrusions 706 formed in the bottom surface 703, and a lamp-receiving portion 704 communicating between the light output surface 702 and the bottom surface 703. The four transparent plate units 72 are tightly arranged side by side to form the assembled optical plate 70. It is to be understood that four LEDs and the combined optical plate 70 can be mounted into a housing to form a larger size backlight module.

In a backlight module using the combined optical plate of the fifth embodiment, a plurality of red, green, and blue colored LEDs can be inserted into the lamp-receiving portions of the combined optical plates, such that a mixed white surface light can be obtained. It is to be understood that other kinds of point light source, such as field emission lamps and so on, can replace the LED 25 in above embodiments.

It should be noted that, the backlight module 200 is not limited to be configured with the optical plate 20 positioned in the housing 21 having the light output surface 202 facing the light diffusion plate 23, but can also be configured with the optical plate 20 positioned in the housing 21 having the bottom surface 203 facing the light diffusion plate 23. That is, the elongated V-shaped protrusions 206 are formed on a first surface of the optical plate 20, and the conical frustum protrusions 205 are formed on a second surface of the optical plate 20. The first surface is selected from one of the light output surface 202 and the bottom surface 203, and the second surface is selected from the other one of the light output surface 202 and the bottom surface 203. However, if a lamp-receiving portion is a blind hole, a surface where the blind hole is defined must be a bottom surface and the other surface must be a light output surface.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a first surface;
   a second surface opposite to the first surface;
   a plurality of elongated V-shaped protrusions formed on the first surface;
   a plurality of stacked conical frustum protrusions formed on the second surface; and
   at least a lamp-receiving portion defined in at least one of the first surface and the second surface, wherein each stacked conical frustum protrusion has a first conical frustum protrusion and a second conical frustum protrusion, the second conical frustum protrusion positioned on top of the first conical frustum protrusion, an inclined angle defined by a conical surface of the first conical protrusion relative to its base surface is equal to or smaller than an inclined angle defined by a conical surface of the second conical protrusion relative to its base surface.

2. The optical plate according to claim 1, wherein the inclined angle defined by a conical surface of the first conical protrusion relative to its base surface or defined by a conical surface of the second conical protrusion relative to its base surface is larger than zero, and equal to or smaller than 60 degrees.

3. The optical plate according to claim 1, wherein a diameter of a bottom end of each conical frustum protrusion is configured to be in a range from about 0.02 millimeters to about 4 millimeters.

4. The optical plate according to claim 1, wherein a height of each conical frustum protrusion is configured to be in a range from about 0.01 millimeters to about 3 millimeters.

5. The optical plate according to claim 1, wherein the conical frustum protrusions are distributed symmetrically relative to the lamp-receiving portion, a diameter of each conical frustum protrusion in a same plane increases with increasing distance from the lamp-receiving portion.

6. The optical plate according to claim 1, wherein the elongated V-shaped protrusions are aligned with each other, each elongated V-shaped protrusion has a first side surface and a second first side surface meeting with the first side surface, in a same elongated V-shaped protrusion, a distance from the first side surface to the lamp receiving portion is smaller than a distance from the second side surface to the lamp receiving portion, a first angle of the first side surfaces relative to its base surface is larger than 90, and equal to or smaller than 120 degrees; a second angle of the second side surface relative to its base surface is larger than 105, and equal to or smaller than 150 degrees.

7. The optical plate according to claim 1, wherein a width of a bottom end of each elongated V-shaped protrusion is configured to be in a range from 0.05 millimeters to 0.5 millimeters.

8. The optical plate according to claim 1, wherein the lamp-receiving portion is selected from one of blind hole and through hole communicating with the first surface and the second surface.

9. The optical plate according to claim 1, wherein the optical plate includes a plurality of the transparent plate units, the transparent plate units being tightly combined with each other.

10. A backlight module comprising:
a housing having a base and a plurality of sidewalls extending around a periphery of the base, the base and the sidewalls cooperatively forming an opening;
at least one point light source positioned on the base, each point light source having a light-emitting portion and a reflective member positioned above the top of the light-emitting portion;
an optical plate positioned in the housing, the optical plate including at least one transparent plate unit having:
at least one transparent plate unit having:
a first surface;
a second surface opposite to the first surface;
a plurality of elongated V-shaped protrusions formed on the first surface;
a plurality of stacked conical frustum protrusions formed on the second surface, each stacked conical frustum protrusion having a first conical frustum protrusion and a second conical frustum protrusion, the second conical frustum protrusion positioned on top of the first conical frustum protrusion, an inclined angle defined by a conical surface of the first conical protrusion relative to its base surface is equal to or smaller than an inclined angle defined by a conical surface of the second conical protrusion relative to its base surface; and
at least a lamp-receiving portion defined in at least one of the first surface and the second surface, wherein the light-emitting portion of the at least one point light source is inserted in the lamp-receiving portion correspondingly; and
a light diffusion plate positioned on the housing over the opening.

11. The backlight module according to claim 10, further comprising a light reflective plate defining a through hole therein, the light reflective plate being positioned underneath a bottom surface of the optical plate, and the point light source passing through the light reflective plate via the through hole.

12. The backlight module according to claim 10, wherein the light reflective plate further comprises a plurality of reflective sidewalls extending around a periphery thereof and contacting with the sidewalls of the housing.

13. The backlight module according to claim 10, wherein the housing is made of metal materials, and has high reflectivity inner surface.

14. The backlight module according to claim 10, further comprising a high reflectivity film deposited on inner surface of the base and the sidewalls of the housing.

15. The backlight module according to claim 10, further comprising a prism sheet positioned on the light diffusion plate.

* * * * *